(12) United States Patent
Guajardo

(10) Patent No.: US 12,480,784 B2
(45) Date of Patent: Nov. 25, 2025

(54) MOBILE METERING OF POWER MEASUREMENTS

(71) Applicant: DISH Wireless L.L.C., Englewood, CO (US)

(72) Inventor: Marcel Guajardo, Lakewood, CO (US)

(73) Assignee: DISH Wireless L.L.C., Englewood, CO (US)

( * ) Notice: Subject to any disclaimer, the term of this patent is extended or adjusted under 35 U.S.C. 154(b) by 299 days.

(21) Appl. No.: 17/018,749

(22) Filed: Sep. 11, 2020

(65) Prior Publication Data
US 2022/0082410 A1   Mar. 17, 2022

(51) Int. Cl.
*G01D 4/00*   (2006.01)
*G01R 31/40*   (2020.01)

(52) U.S. Cl.
CPC .............. *G01D 4/006* (2013.01); *G01R 31/40* (2013.01)

(58) Field of Classification Search
CPC ................................ G01D 4/006; G01R 31/40
See application file for complete search history.

(56) References Cited

U.S. PATENT DOCUMENTS

| | | | |
|---|---|---|---|
| 9,112,621 B1* | 8/2015 | Mishra | H04H 60/66 |
| 2008/0231512 A1* | 9/2008 | Yeshayahu | G01S 19/21 |
| | | | 342/417 |
| 2011/0207411 A1* | 8/2011 | Phillips | G06Q 30/0282 |
| | | | 455/67.11 |
| 2012/0295654 A1* | 11/2012 | Sridhara | G01S 5/0205 |
| | | | 455/517 |
| 2018/0192297 A1* | 7/2018 | Chadaga | H04W 52/242 |
| 2018/0302805 A1* | 10/2018 | Lim | H04L 47/40 |
| 2019/0166453 A1* | 5/2019 | Edge | G01S 5/0036 |

FOREIGN PATENT DOCUMENTS

| | | | | |
|---|---|---|---|---|
| CN | 106375127 | * | 2/2017 | H04L 41/42 |
| JP | WO2009066622 | * | 5/2009 | H04W 24/08 |

* cited by examiner

*Primary Examiner* — Alexander Satanovsky
(74) *Attorney, Agent, or Firm* — Perkins Coie LLP

(57) ABSTRACT

A technique is described for mobile metering of a communication network. As an example, a server may receive, from one or more mobile devices, one or more data packets and extract one or more power measurements, determine a distribution protocol associated with the one or more power measurements, identify a geolocation associated with the one or more power measurements, and determine signal quality data based on the geolocation and the one or more power measurements, and store the signal quality data at a server.

17 Claims, 6 Drawing Sheets

MOBILE METERING OF POWER MEASUREMENTS

BACKGROUND

Presently, a variety of content distributors may provide content to users. For example, a user may receive content from cellular networks, cable networks, or satellite networks. However, a distributor may not have signal strength measurements at locations inside the coverage area of the distributor's network. In some cases, the distributor may be unaware which locations have a strong enough signal to provide content to subscribers.

Figure 1:
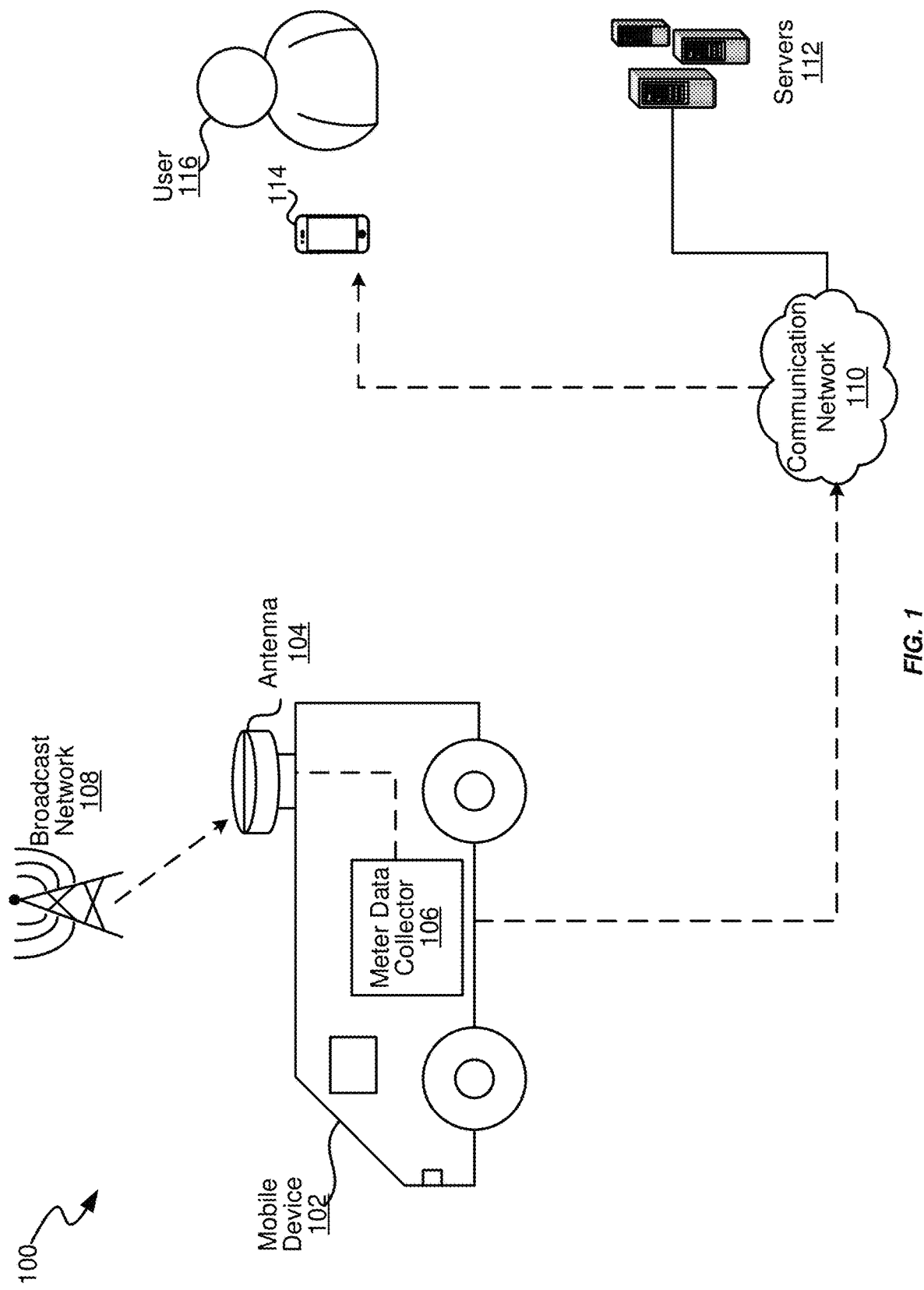
FIG. 1 is a schematic diagram showing a logical system architecture, in accordance with an embodiment.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The quality of a signal from a distributor may vary between locations inside the distributor's network coverage. The signal quality may fluctuate due to the landscape (e.g., buildings, trees, hills, etc.) interfering with the path between the transmitter and receiver of the signal. Mobile devices can meter signals to determine the power measurements of the signals at locations inside the distributor's network. The mobile device may autonomously collect the power measurements and upload the measurements to a database. In an embodiment, the mobile device tags the power measurements with a geolocation. The distributor may use the power measurements and associated geolocation to inform subscribers or potential subscribers of the signal quality at various measured locations. An embodiment includes a mobile device which captures power measurements of signals and transmits the power measurements to the distributor's server.

In FIG. 1, a schematic diagram illustrates a logical system architecture 100. A mobile device 102 (e.g., a vehicle, drone, smartphone, tablet, etc.) may contain a meter data collector 106. As shown, meter data collector 106 is operatively connected via wireless or wired connection to an antenna 104. In an embodiment, the antenna 104 receives a transmission from a broadcast network 108 (e.g., over-the-air (OTA), internet, satellite, or wireless service) and meter data collector 106 measures parameters such as the signal quality, strength (e.g., signal to noise ratio (SNR)), bandwidth, or power level of the transmission. In an embodiment, the meter data collector 106 may tag the measurement data with a geolocation (e.g., GPS, latitude and longitude position, etc.). The meter data collector 106 may send the measurement data periodically or incrementally to the communications network 110 where it is stored at the servers 112.

In an embodiment, the mobile device 102 may be a service vehicle (e.g., in home service (IHS), installation, maintenance, or site planning technician vehicle) of a content distributor. The meter data collector 106 may autonomously measure transmissions from the broadcast network 108 periodically or when the mobile device 102 travels a threshold distance (e.g., a tenth of a mile). In another embodiment, the meter data collector 106 may measure transmissions whenever the mobile device 102 is stationary for threshold amount of time (e.g., 30 seconds).

In an embodiment, a user 116 may request the measured data with device 114 to determine if the distributor's network provides a service at a location (e.g., a subscriber or potential-subscriber location). For example, a potential subscriber building a house may inquire if a location is covered by advanced television system committee (ATSC) 3.0. Using the measured data tagged with the geolocation, the distributor may provide the user 116 with results for the inquired location. In an embodiment, the servers 112 may transmit, to device 114, measurement data identifying aggregated signal quality data. In another embodiment, the servers 112 may transmit data identifying estimated signal quality data based upon evaluation of the received signal quality data from meter data collector 106. In another embodiment, the distributor may compile a network map of the measurement data to identify the signal quality of areas in the network.

Figure 2:
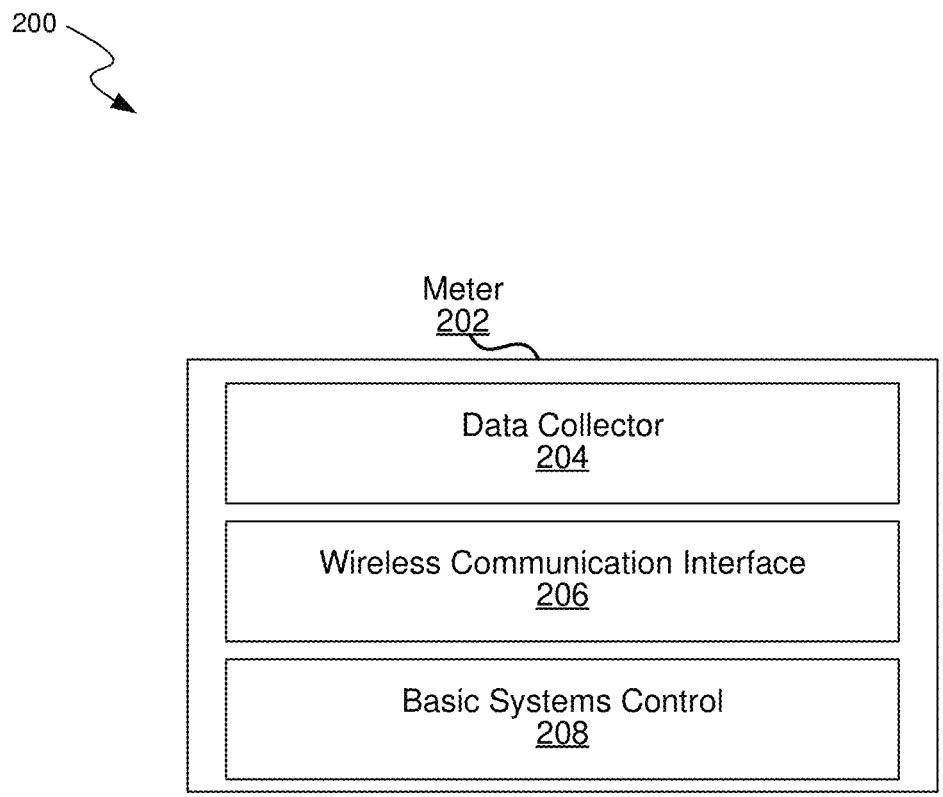
FIG. 2 is a schematic diagram showing the devices of the mobile metering process, according to an embodiment.

FIG. 2 illustrates an embodiment of a mobile meter in a system 200. The meter 202 (e.g., an over the air (OTA) meter) may include a data collector 204, a wireless communication interface 206, and a basic system control 208. The meter 202 may capture signal measurements autonomously and upload, incrementally or periodically, the measurements to a cloud server of a distributor. In some instances, the distributor may use the information to expand its database of actual signal measurements (e.g., ATSC 1.0 or 3.0 signal measurements) and estimate prospective customers' candidacy for OTA services.

The meter 202 may connect directly to an OTA antenna setup that receives transmissions (e.g., radio frequency signals). The meter 202 may interface with the data collector 204. The data collector 204 may record and store signal measurements and forward them to a distributors communication network where the measurements are stored on servers. The wireless communication interface 206 is a physical mechanism that may wirelessly transmit the signal measurements to the distributor's communication network. The basic system control 208 may contain the operating software that resides on the meter 202 and includes but is not limited to power control (e.g., turning on/off or low-power standby), signal measurement scheduling and protocol (e.g., when to begin recording signal measurements), or security (e.g., preventing data theft and deleting information in the event of meter theft).

Figure 3:
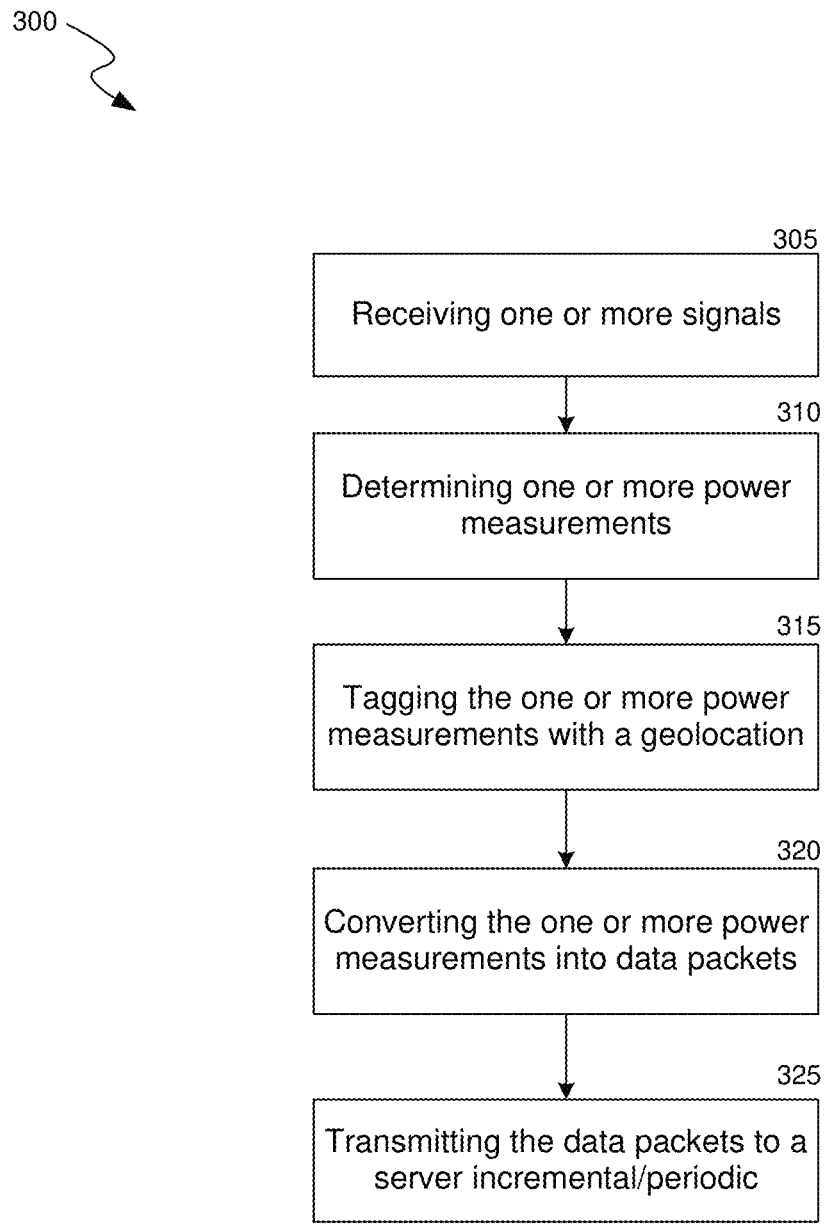
FIG. 3 is a flow diagram of an exemplary process for mobile metering, according to an embodiment.

FIG. 3 illustrates an embodiment of process 300 of mobile metering. At 305, a mobile device (e.g., mobile OTA meter) may receive one or more signals from a broadcast network.

In an embodiment, the mobile may receive signals when the mobile device is stationary at a geolocation of a subscriber or a potential subscriber. In another embodiment, the mobile may receive signals when the mobile device has traveled a distance (e.g., tenth of a mile, city block, etc.).

At step 310, the mobile device may measure parameters such as the signal quality, signal strength (e.g., SNR), bandwidth, or power level of the signals. For example, the mobile device determines one or more power measurements (e.g., −50 dBm) of the one or more signals. In an embodiment, the mobile device may measure a minimum and maximum power measurement of signals at a location. In another embodiment, the mobile device takes several measurements of signals at a location to determine signal consistency at the location. In another embodiment, the mobile device takes repeated measurements of a location to determine an average power measurement at the location.

At step 315, the mobile device may tag the one or more power measurements with a geolocation (e.g., each measurement is paired to geo-located information, such as a latitude or longitude, street address, subscriber location, or other regional identifier). At step 320, the mobile device may convert the one or more power measurements into data packets. At step 325, the mobile device may incrementally or periodically transmit the data packets to a server.

Figure 4:
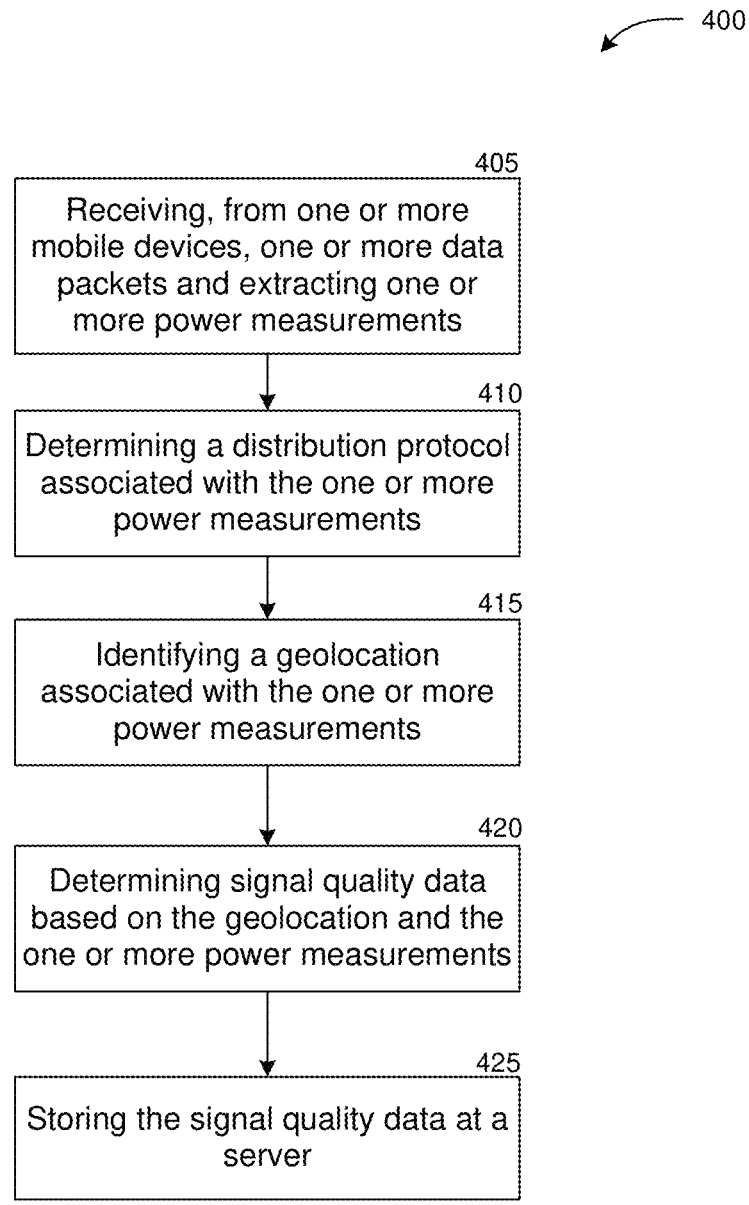
FIG. 4 is a flow diagram of an exemplary process for mobile metering, according to an embodiment.

FIG. 4 illustrates an embodiment of process 400 of mobile metering. At step 405, a server may receive, periodically or incrementally from one or more mobile devices, one or more data packets. The server may extract one or more signal parameters from the data packets. In an embodiment, the signal parameters may include the signal quality, signal strength (e.g., SNR), bandwidth, or power measurements of the signals.

At step 410, the server may determine a distribution protocol (e.g., ATSC 1.0, ATSC 3.0, 5G, etc.) associated with the one or more power measurements. At step 415, the server may identify a geolocation associated with the one or more power measurements. In an embodiment, the geolocation is associated with a location of a subscriber or a potential subscriber. In some implementations, the server may request the geolocation of the power measurements from the mobile device.

At step 420, the server may determine signal quality data based on the geolocation and the one or more power measurements. In an embodiment, the server may determine the one or more power measurements are above or below a threshold power value and assign the signal quality data to the geolocation based on the one or power measurements being above or below the threshold power value. For example, as illustrated in table 1, if the power measurement is below −75 dBm, the signal quality data for that location is labeled weak, if the power measurement is above −50 dBm, the signal quality data for that location is labeled strong, if the power measurement is between −51 and −74 dBm, the signal quality data for that location is labeled okay.

TABLE 1

| Power (Signal Strength) | Signal Readings |
| --- | --- |
| <−85 dBm | Not Valid = Extremely weak (no signal detected) |
| <−75 dBm | Weak |
| −51 to −74 dBm | Okay |
| >−50 dBm | Strong |

At step 425, the server may store the signal quality data at a server. In an embodiment, the server may receive a request, from a device of a subscriber, for the signal quality data associated with a geolocation. The server may transmit signal quality data to the device of the subscriber.

Figure 5:
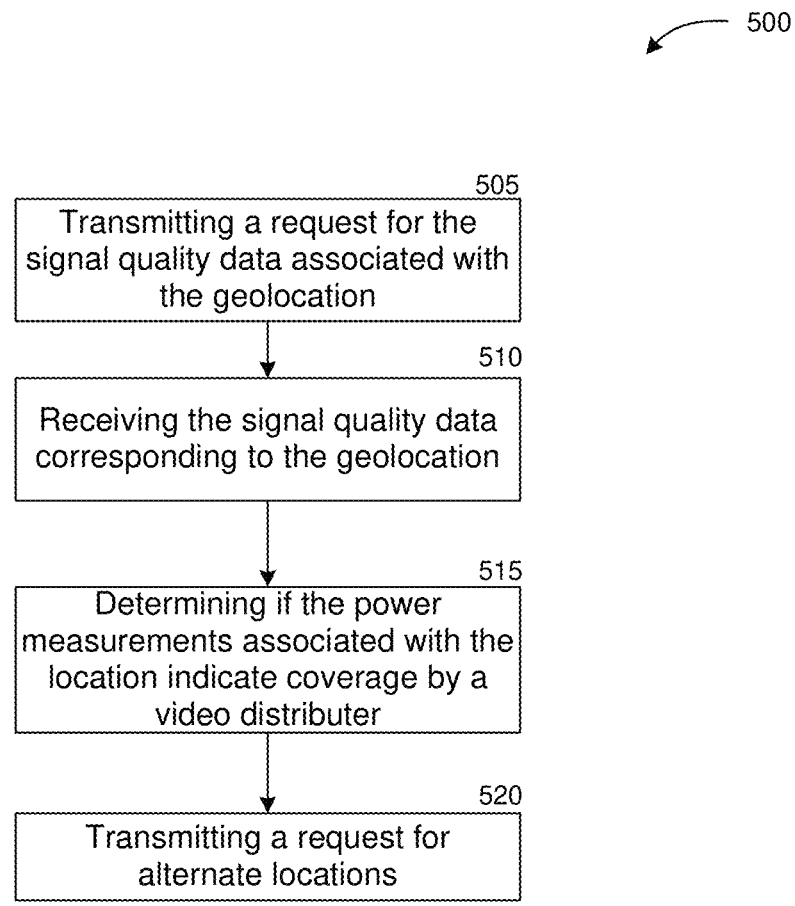
FIG. 5 is a flow diagram of an exemplary process for mobile metering, according to an embodiment.

FIG. 5 illustrates an embodiment of process 500 of mobile metering. At step 505, a device may request, from a server, the signal quality data associated with the geolocation (e.g., a location associated with a subscriber or potential subscriber location). In some implementations, the device is associated with a subscriber. In other implementations, the device is a mobile vehicle capturing signal measurements.

At step 510, the device may receive the signal quality data corresponding to the location proximal to a subscriber location or location of the mobile meter. At step 515, the device may determine if the power measurements associated with the location indicate a network coverage by a video distributer based on the signal quality data. At step 520, the device may request signal quality data for alternate locations.

Figure 6:
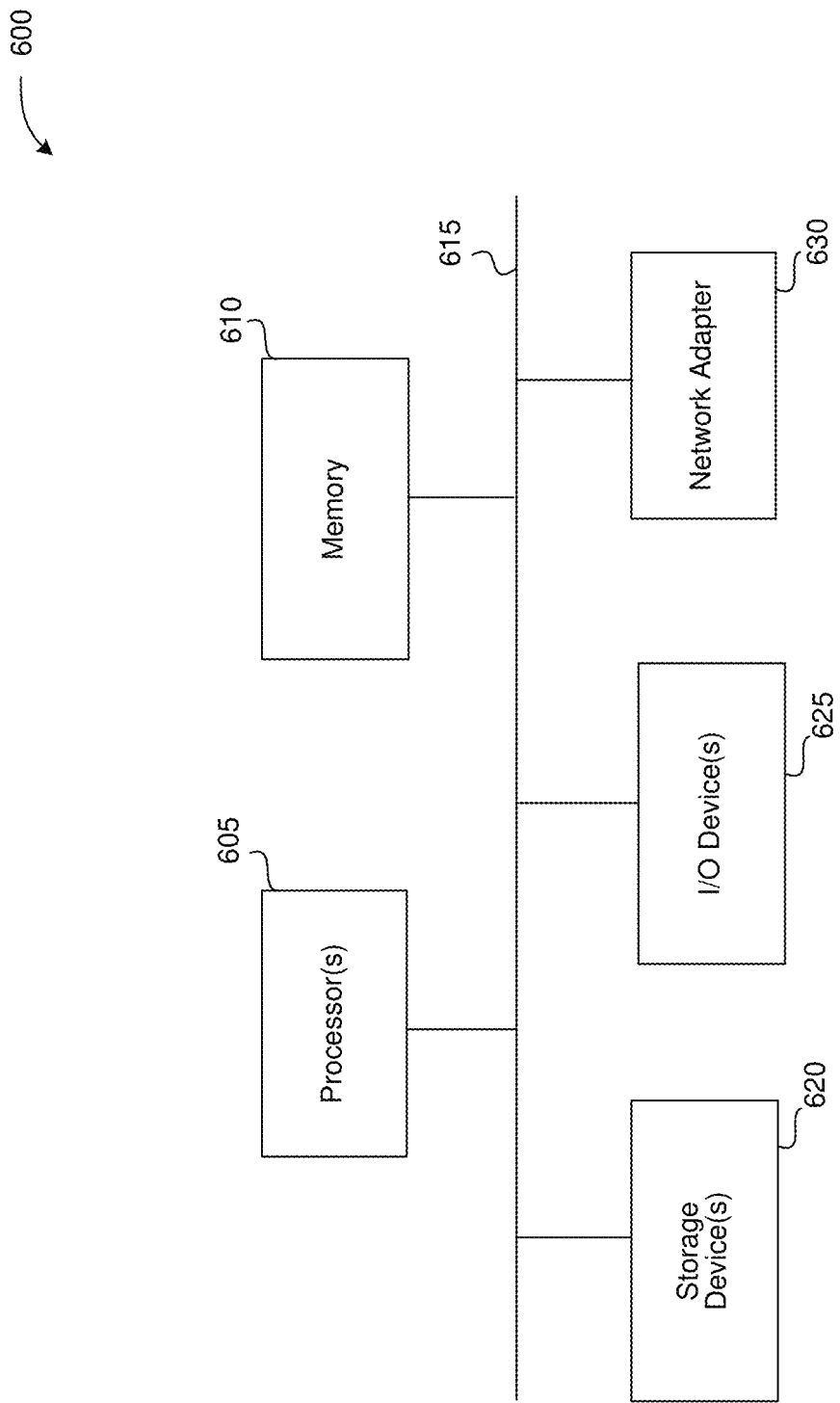
FIG. 6 is a block diagram of a processing system that can implement operations of the disclosed embodiments.

FIG. 6 is a block diagram of a computer system as may be used to implement features of the disclosed embodiments. The computer system 600 may be used to implement any of the entities, components or services depicted in the examples of the foregoing figures (and any other components described in this specification). The computer system 600 may include one or more central processing units ("processors") 605, memory 610, input/output devices 625 (e.g., keyboard and pointing devices, display devices), storage devices 620 (e.g., disk drives), and network adapters 630 (e.g., network interfaces) that are connected to an interconnect 615. The interconnect 615 is illustrated as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Components (IEEE) standard 1394 bus, also called "Firewire".

The memory 610 and storage devices 620 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 610 can be implemented as software and/or firmware to program the processor(s) 605 to carry out actions described above. In some embodiments, such software or firmware may be initially provided to the computer system 600 by downloading it from a remote system through the computer system 600 (e.g., via network adapter 630).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A method, comprising:
   receiving, from at least one device attached to a vehicle of a network provider, a plurality of power measurements of signals captured at a first geolocation by the at least one device,
      wherein in response to receiving data indicating that the vehicle is stationary at the first geolocation for a threshold time, the at least one device captures the plurality of power measurements at the first geolocation
      wherein the at least one device captures, while the vehicle is stationary for the threshold time at the first geolocation, at least a minimum, maximum, and average power measurement at the first geolocation, and
      wherein the plurality of power measurements are tagged with a subscriber location;
   identifying the subscriber location associated with the plurality of power measurements;
   determining signal power data based on the subscriber location and the plurality of power measurements;
   storing the signal power data at a server;
   receiving, from a device of a subscriber or a potential subscriber of the network provider, a request for the signal power data associated with a second geolocation proximal to the subscriber location; and
   transmitting, to the device of the subscriber or the potential subscriber of the network provider, the signal power data for the subscriber location.

2. The method of claim 1, wherein determining the signal power data, further comprises:
   determining the plurality of power measurements are above or below a threshold power value; and
   assigning the signal power data to the subscriber location based on the plurality of power measurements being above or below the threshold power value.

3. The method of claim 2, wherein the subscriber location is associated with a location of at least one subscriber to the network provider.

4. The method of claim 1, further comprising:
   requesting the first geolocation from the at least one device.

5. The method of claim 1, further comprising:
   receiving the plurality of power measurements periodically from the at least one device.

6. The method of claim 1, wherein a distribution protocol of the signals is an advanced television system committee (ATSC) protocol.

7. A non-transitory computer-readable medium storing instructions that, when executed by a computing system, cause the computing system to perform operations comprising:
   receiving, from at least one device attached to a vehicle of a network provider, a plurality of power measurements of signals captured at a first geolocation by the at least one device,
      wherein in response to receiving data indicating that the vehicle is stationary at the first geolocation for a threshold time, the at least one device captures the plurality of power measurements at the first geolocation,
      wherein the at least one device captures, while the vehicle is stationary for the threshold time at the first geolocation, at least a minimum, maximum, and average power measurement at the first geolocation, and wherein the plurality of power measurements are tagged with a subscriber location;

identifying the subscriber location associated with the plurality of power measurements;

determining signal power data based on the subscriber location and the plurality of power measurements;

storing the signal power data at a server;

receiving, from a device of a subscriber or a potential subscriber of the network provider, a request for the signal power data associated with a second geolocation proximal to the subscriber location; and transmitting, to the device of the subscriber or the potential subscriber of the network provider, the signal power data for the subscriber location.

8. The non-transitory computer-readable medium of claim 7, wherein the operations further comprise:

determining the plurality of power measurements are above or below a threshold power value; and assigning the signal power data to the subscriber location based on the plurality of power measurements being above or below the threshold power value.

9. The non-transitory computer-readable medium of claim 7, wherein the subscriber location is associated with a location of at least one subscriber to the network provider.

10. The non-transitory computer-readable medium of claim 7, wherein the operations further comprise:

requesting the first geolocation from the at least one device.

11. The non-transitory computer-readable medium of claim 7, wherein the operations further comprise:

receiving the plurality of power measurements periodically from the at least one device.

12. The non-transitory computer-readable medium of claim 7, wherein a distribution protocol of the signals is an advanced television system committee (ATSC) protocol.

13. A system comprising:

one or more processors; and one or more memories storing instructions that, when executed by the one or more processors, cause the system to perform a process comprising:

receiving, from at least one device attached to a vehicle of a network provider, a plurality of power measurements of signals captured at a first geolocation by the at least one device, wherein, in response to receiving data indicating that the vehicle is stationary at the first geolocation for a threshold time, the at least one device captures the plurality of power measurements at the first geolocation, wherein the at least one device captures, while the vehicle is stationary for the threshold time at the first geolocation, at least a minimum, maximum, and average power measurement at the first geolocation, and wherein the plurality of power measurements are tagged with a subscriber location;

identifying the subscriber location associated with the plurality of power measurements;

determining signal power data based on the subscriber location and the plurality of power measurements;

storing the signal power data at a server;

receiving, from a device of a subscriber or a potential subscriber of the network provider, a request for the signal power data associated with a second geolocation proximal to the subscriber location; and transmitting, to the device of the subscriber or the potential subscriber of the network provider, the signal power data for the subscriber location.

14. The system according to claim 13, wherein the process further comprises:

determining the plurality of power measurements are above or below a threshold power value; and assigning the signal power data to the subscriber location based on the plurality of power measurements being above or below the threshold power value.

15. The system according to claim 13, wherein the process further comprises:

requesting the first geolocation from the at least one device.

16. The system according to claim 13, wherein the process further comprises:

receiving the plurality of power measurements periodically from the at least one device.

17. The system according to claim 13, wherein the subscriber location is associated with a location of at least one subscriber to the network provider, and wherein a distribution protocol of the signals is an advanced television system committee (ATSC) protocol.

* * * * *